US008312843B2

(12) United States Patent
Ortego et al.

(10) Patent No.: US 8,312,843 B2
(45) Date of Patent: Nov. 20, 2012

(54) ARTIFICIAL MATERIAL CONDUCIVE TO ATTRACT AND GROW OYSTERS, MOLLUSKS OR OTHER PRODUCTIVE AND/OR STABILIZING ORGANISMS

(75) Inventors: Tyler R. Ortego, Baton Rouge, LA (US); Robert L. Beine, Baton Rouge, LA (US); Steven G. Hall, Baton Rouge, LA (US); Matthew D. Campbell, Austin, TX (US)

(73) Assignee: ORA Technologies, LLC, Opelousas, LA (US)

( * ) Notice: Subject to any disclaimer, the term of this patent is extended or adjusted under 35 U.S.C. 154(b) by 1172 days.

(21) Appl. No.: 11/428,060

(22) Filed: Jun. 30, 2006

(65) Prior Publication Data

US 2007/0107663 A1   May 17, 2007
US 2010/0126425 A9   May 27, 2010

Related U.S. Application Data

(63) Continuation-in-part of application No. 11/321,874, filed on Dec. 28, 2005, now Pat. No. 7,144,196.

(60) Provisional application No. 60/737,145, filed on Nov. 15, 2005.

(51) Int. Cl.
*A01K 61/00* (2006.01)
(52) U.S. Cl. ............ 119/237; 119/234; 119/210
(58) Field of Classification Search .......... 119/200, 119/207–210, 212, 219, 221, 234, 242, 236–238; 106/724
See application file for complete search history.

(56) References Cited

U.S. PATENT DOCUMENTS

| 2,017,090 | A  | * | 10/1935 | Eggert, Jr. ............... 71/23 |
| 3,238,279 | A  | * | 3/1966 | Tarlton et al. ............. 264/82 |
| 4,047,962 | A  | * | 9/1977 | Copeland ................. 106/674 |
| 4,468,885 | A  | * | 9/1984 | Mandish ................... 47/59 R |
| 4,843,112 | A  | * | 6/1989 | Gerhart et al. ............ 523/114 |
| 4,844,015 | A  |   | 7/1989 | Garvey et al. |
| 4,996,943 | A  |   | 3/1991 | Garvey |
| 4,997,311 | A  | * | 3/1991 | Van Doren ................ 405/30 |
| 5,803,660 | A  | * | 9/1998 | Warren et al. ............. 405/25 |
| 6,897,382 | B2 | * | 5/2005 | Hager et al. .............. 174/116 |
| 7,144,196 | B1 | * | 12/2006 | Campbell et al. ............ 405/30 |

FOREIGN PATENT DOCUMENTS

| FR | 2627951 A1 | * | 9/1989 |
| JP | 01179634 A | * | 7/1989 |
| JP | 05098654 A | * | 4/1993 |
| JP | 2000178057 A | * | 6/2000 |
| JP | 2006025720 A | * | 2/2006 |
| JP | 2006223297 A | * | 8/2006 |
| WO | WO 01/19180 A1 | * | 3/2001 |

OTHER PUBLICATIONS

Nature Safe, Product General Information, www.atlanticfec.com/20.htm.*

* cited by examiner

*Primary Examiner* — Kimberly Berona
(74) *Attorney, Agent, or Firm* — John B. Edel; Edel Patents LLC

(57) ABSTRACT

Structures constructed from an artificial material facilitate the setting and growing of oysters, other mollusks, and other organisms for the purposes of food production, artificial reefs/breakwaters, and the like. The artificial material is a composite that acts as both an attractant and nutrient environment for mollusks and other aquatic organisms. The binder for the composite material includes both cement and an organic material. The organic material is selected to attract and feed the aquatic organisms.

16 Claims, No Drawings

ARTIFICIAL MATERIAL CONDUCIVE TO ATTRACT AND GROW OYSTERS, MOLLUSKS OR OTHER PRODUCTIVE AND/OR STABILIZING ORGANISMS

This application claims the benefit of U.S. Provisional Application Ser. No. 60/737,145, filed Nov. 15, 2005, and is a continuation-in-part of U.S. application Ser. No. 11/321,874, now U.S. Pat. No. 7,144,196, filed on Dec. 28, 2005, which in turn claims priority to U.S. Provisional Application Ser. No. 60/737,145, filed Nov. 15, 2005.

FIELD OF THE INVENTION

The present invention relates to an artificial material that is conducive to attract and grow organisms and, more specifically, to such an artificial material that is also operable as a building material for the production of structures. Structures constructed from the artificial material of the present invention facilitate the setting and growing of oysters, other mollusks, and other organisms for the purposes of food production, artificial reefs/breakwaters, and the like.

STATEMENT REGARDING FEDERALLY SPONSORED RESEARCH OR DEVELOPMENT

No federal funds were used in the creation of this invention.

BACKGROUND

Shellfish, such as mollusks and, more specifically, oysters, act as both a food source and a natural protectant to coastlines. Mollusks are in the scientific class Biealvia and include species such as clams, oysters, scallops, muscles, etc. Mollusks tend to live in clusters with reproduction typically occurring through the release of sperm or eggs into the water. The steps of fertilization, hatching, and larval development occur in plankton community (free floating). Larvae continue to float in the water until, after a given period of time, they are ready to attach to a suitable substrate. The process of attaching or catching to a surface is called "cultching." The catching or substrate material is referred to as "cultch" and recently settled oysters are known as "spat."

The freshly settled or cultched oysters are prone to predators, such as crabs, starfish, oyster drills, and other predators. Mollusks, such as muscles and oysters, also must compete with barnacles, slipper shells, sponges, and other sea life for space and food. For instance, shrimp are known to burrow into oyster beds, which can smother young oysters and/or damage the desirable oyster-growing conditions. Oyster drills are small snails that move across oyster beds in order to find and eat oysters. Oyster drills have the ability to soften the shell of shellfish and other marine animals, but they prefer juvenile oysters. For that reason, oyster growers sometimes attempt to cultivate oysters in lower salinity waters that is tolerable to oysters but not to snails.

To develop as a food crop, oyster spat will ideally attach to a fixed substrate that provides predatory protection, nutrients for growth, and ease of later harvesting. Typically, old shells from previously harvested oysters are used as cultch. One known technology for oyster cultivation is, therefore, to dredge old oyster shells, clean the shells via high-pressure water hoses or other means, and to place the shells in desired locations for oyster development. Oyster growers have also devised "setting" tanks. These tanks contain seawater that is aerated and heated. The tanks are filled with bags of clean shell to catch the shellfish seed. Larval shellfish and oysters are added to the cultch-filled tanks. The problems with known techniques include the fact that the dredging of old mollusk beds for mollusk shells may negatively impact the environment. Special tanks or cultch structures have often proven to be expensive or ineffective.

Shellfish beds also provide environmental enhancements such as the reduction of erosion and reduced wave and storm damage to a coastline. Large shellfish reefs such as oyster reefs, are known to reduce the size and intensity of waves and to reduce erosion. These natural beds are advantageous relative to artificial reefs because artificial reefs currently require the use of large, heavy equipment to drop large limestone rocks or other material as breakwaters. The equipment, along with the types and size of the artificial material, can damage the area that the breakwater is intended to protect by the placements of the artificial reefs.

Current materials used for artificial reefs can include scrap material that is not suitable or desirable for organism growth. While such artificial reefs may mitigate coastal damage or erosion, a healthy ecosystem requires a reef material that promotes or encourages organism growth. Therefore, it has also been desired that a material for artificial water-based structures encourage the growth of other organisms such as beneficial bacteria, plants, and other animal species.

Bacteria that is important to the nitrogen cycle (a biogeochemical cycle that describes the transformation of gaseous nitrogen into forms useable by living organisms and vice-versa), such as nitrosomonas or nitrobacter, and other bacteria often improve water quality or otherwise contribute to an ecosystems health and stability. Obviously, plants such as spartina alterniflora cordgrass, freshwater plants, algae, red mangroves, or other water-based plant species are desirable in many healthy ecosystems. Corals, barnacles, and nonsessile but stabilizing organisms form a part of healthy ecosystems as well. 'Stabilizing', in this context, means communities of organisms that expand over time to provide structural protection to a shoreline. 'Stabilizing' also applies to organisms that provide other positive effects to an aquatic ecosystem, such as acting as a filter, releasing nutrients, and the like. Scientists have sought the development of an artificial material that is suitable as a building material that would also increase, encourage, or otherwise facilitate the growth of these desirable organisms.

Therefore, there exists a need to create an artificial material for the production of structures that would facilitate the setting and growing of numerous organisms. The material would ideally encourage the growth of many other desirable or necessary organisms such as mollusks, bacteria, algae, plants, and non-mollusk animals. A composite material providing nutrients and the required structural integrity has been sought. Optionally, the artificial material would include means to reduce the impact of predators on cultched mollusks such as oysters. The present invention solves one or more of these other needs.

SUMMARY OF THE INVENTION

In accordance with the present invention, an artificial material for the production of underwater structures wherein the material facilitates the setting and/or growing of many organisms is provided. The material is suited for oysters and other mollusks. The material is a composite that acts as both an attractant and nutrient environment for mollusks or other aquatic organisms Therefore, the material attracts and/or encourages the growth of bacteria, plant life, or non-mollusk animals. These organisms often serve as a food source for mollusks. The structure can be formed into a breakwater or may be specifically used for the purpose of cultivation of desirable species. Optionally, the material can reduce the impact of predators on cultched mollusks.

In one preferred embodiment, the material is a composite material containing one or more binding materials, one or more types of coarse filler materials, and one or more organic materials. The binder can be a cement or other adhesive. A fine filler may also be added. Short fiberglass fibers are optionally added to the composite material to reduce predation to mollusks due to oyster drill or other predators. These fibers may also add structural strength to the building material.

The ratio of the various components by weight can vary. The range of the components by weight of the composite material is, in one preferred embodiment, as follows: binder 1 part; fine filler 0 to 3 parts; coarse filler 1 to 10 parts; organic material 0.0005 to 1 part; and (optionally) fiberglass fibers 0.5 to 10 pounds per cubic yard. Optionally, common concrete additives such as accelerants, water reducers, viscosity modifiers, and the like are added to the building material production. The binder may optionally include pozzolan, fly ash, or the like. In another preferred embodiment, the binder used to produce the artificial cultch material can be a slowly biodegradable adhesive such as cornstarch polymers. The biodegradable adhesive creates a matrix to which the oyster, shellfish, or other organisms will initially adhere. Biodegration of the structure will later allow easy crushing of the material for isolation of the harvested organism, such as oysters, from the structure for food production operations.

The artificial cultch material is also useful as a building material in the construction of artificial reefs such as those disclosed in U.S. Provisional Patent Application No. 60/737,145, filed Nov. 15, 2005, which is herein incorporated by reference. The placement, shape, and other features of the structures can vary as desired.

The organic material contained in the artificial clutching material of the present invention provides relatively high levels of nitrogen and fat while providing relatively little or no sugar. In feed, a nitrogen value is generally expressed as "percent crude protein" (wherein 1% nitrogen is equivalent to 6.25% crude protein). The organic material in the present invention provides between 1% to 100% nitrogen, greater than 0% fat, and sugar content less than 10% by weight. In one example, the material of the present invention provides between 2% to 8% nitrogen (12.5% to 50% crude protein). In another preferred embodiment, fat content of the organic material is greater than 2% by weight, and sugar content (mono and di saccharides) is less that 2% by weight. Suitable materials include, but are not limited to, cottonseeds, peanuts in shell, animal byproducts, slow release fertilizers, or other suitable organic materials providing the desired release of nutrients, which will be known to one of skill in the art.

An artificial material suitable for the construction of structures in accordance with the present invention efficiently addresses at least one of the shortcomings associated with prior art. The foregoing and additional features and advantages of the present invention will become apparent to those of skill in the art from the following detailed description of a preferred embodiment.

DETAILED DESCRIPTION

The artificial material suitable for the construction of structures as provided for by the present invention improves upon prior art artificial building materials for artificial reefs, breakwaters, cultch structures, and the like. In addition to facilitating the growth and protection of shellfish or other organisms, the material is operable to form structures for the creation of artificial reefs. The artificial material encourages a wide range of organism growth including bacteria, plants, algae, and other animal species.

The material is a composite material that includes a binder such as a cement or adhesive. As the material is intended for several distinct purposes (e.g. food production and protective breakwaters), the specific binder type can vary. One preferred binder includes known cement mixtures, such as Portland cement, mixed with or without pozzolan, fly ash, or other combustoin byproduct materials.

The cement or binder material is generally selected from calcium rich materials (roughly greater than 10% by weight). Portland cement, for instance, has a relatively high calcium content without exhibiting a excessively high pH level (for instance, less than 10 ph). In addition, the selected binder material should not contain high levels of toxic minerals or heavy metals (less than about 1% by weight). This is particularly important where the binder material is a byproduct material or includes one or more byproduct materials (e.g., fly ash, pozzolan materials, or the like). Common admixtures may be added to improve the quality or production of the composite material. Therefore, known accelerants, water reducers, viscosity modifiers, and the like are optionally added to the binder component of the composite material.

In another preferred embodiment, the binder component is an adhesive. In yet another preferred embodiment, the adhesive is a slowly biodegradable adhesive such as cornstarch polymers, animal-based protein glues, artificial (organic) biodegradable polymers, and the like. The binder is also envisioned as a combination of cement material and a biodegradable adhesive. In addition to creating a matrix upon which organisms can grow or live, a biodegradable material is easily crushed or otherwise disintegrated after a given period of time in a solvent environment. Therefore, a building or cultch material consisting of a composite comprising a biodegradable binder material for food harvesting is easily separated from any shellfish that may have cultched to the structure formed from such a building material.

At least one filler material is added to the binder component of the composite material. The preferred filler materials can comprise fine fillers such as sand, particulate rock, and the like and coarse fillers such as limestone rock, recycled concrete, oyster shell, other calcium-rich solids, and the like.

The filler material can be a coarse filler without any fine or particulate matter (i.e., 0 parts fine filler). However, where the artificial material is used to build a permanent structure, the coarse filler will likely include a level of fine material as required to meet the structural requirements. For instance, "fines"(i.e., relatively small size particulates) and higher filler to cement ratios will be needed for wave mitigation structures, especially if steel reinforcement of the building/cultch material is not desired. For non-structural products built from the artificial cultch material, a "no fines" or permeable material without sand or other fines will create a suitable low-cost, porous structure employing a low (or zero) filler to cement ratio. The zero or low fine composite materials are easier to break apart or crush. Therefore, when the resulting product is used as a cultch structure for food production, it is easily recovered from a natural environment and separated from the shellfish by crushing the cultch material and removing the remaining shellfish.

The composite material forming the artificial material also includes an organic material. A suitable organic component, when incorporated into the composite material, slowly breaks down by bacterial or biodegradation action to release nutrients to the natural flora and fauna. High nutrient levels encourage the growth of microorganisms that are beneficial to a natural habitat, and are particularly beneficial to increasing the availability of the microorganism food to oysters. The degradation of the nutrient material stimulates or encourages the growth of other mollusks, plant life, and other non-mollusk animals.

The organic material contains high levels of nitrogen and fat materials and low levels of sugars. In feed, a nitrogen value is generally expressed as "percent crude protein" (wherein 1% nitrogen is equivalent to 6.25% crude protein). The material provides a nitrogen greater than 1%, a fat content greater than 0%, and a sugar content of less than 10%. In one preferred embodiment, the material of the present invention provides between 2% to 8% nitrogen (12.5% to 50% crude protein). In another preferred embodiment, fat content of the organic material is greater than 2% by weight, and sugar content (mono and di saccharides) is less than 2% by weight. Sugars often reduce the ability of a binder to harden. The organic material contains protein that will break down to release ammonia (a known spat attractant), fats, and free fatty acids. Fats and free fatty acids encourage the growth of, and provide energy to, bacteria, algae and other organisms.

Suitable organic materials include, but are not limited to, cottonseed, peanuts in the shell, animal byproducts, slow release fertilizers, and material containing the desired levels of nitrogen, fat, and sugar. The material releases usable nutrients to microorganisms in the vicinity of the artificial material. Therefore, quality grades of organic material that may not otherwise be suitable for consumption or normal animal feed may be used in the artificial material, and previously useless material, including, for example, high free fatty acid cottonseed and below acceptable grade peanuts, can be incorporated into the composite material to beneficially grow mollusks and other organisms. Other seed species could be used. Such seeds are generally treated to avoid germination, if necessary. It is undesirable to have excessive mycotoxins, pesticides, or other adulterants and toxins in the organic material. It is desirable that the chosen organic material will not swell excessively in the presence of water as this can lead to low structural integrity in an aquatic environment. Cottonseed may include some natural lint on the seed so that if swelling does occur, the seed swells into the space created by the lint during creation of the composite material.

The various components including the binder, filler(s), and organic components are combined by known techniques to form the composite material. The composite material is then used to build the desired structure. It is generally preferred that the texture of any structure formed from the artificial material of the present invention would be made as rough as possible. "Roughness" can be created by reducing fine material down to the minimum level allowed by the structural strength specifications of any specific application. This is not required, however, as a smooth surface would be desirable to grow and cultivate algae.

For food harvesting, a relatively small or portable structure would be anchored in a desired location. The structure is then removed to recover the resulting shellfish or other organisms. Open structures with large surface area are preferred. Organisms could also be added or cultched to the structure before it is placed in a natural habitat. A permanent breakwater structure, using a generally higher strength concrete with fines, would be relatively large and would be sunk in a location as needed by known methods. These structures are more solidly anchored to the seabed and are generally designed as a skeleton upon which growth of various organisms will eventually form a more solid coastal barrier reef.

The artificial material to form a coastal or marsh protection structure is generally very permeable (i.e., very little to no fine component in the composite material). This would be particularly true when the structure is used in water depths suitable to a combination oyster/plant growth combination. After the composite material cures, a compost, rich soil, or other organically rich material can be placed within the structure. The organically rich material would seep through the open pores of the permeable structure. The soil could also be seeded with aquatic-tolerant species of plants.

It is known in the art to use nets or other devices to protect cultched spat. However, oyster drill, a soft-bodied snail and common spat predator, crawls across cultch material. The optional addition of fiberglass fibers to the artificial material of the present invention damages, impedes, or otherwise dissuades oyster drill and other soft bodied predators. In one preferred embodiment, the fiberglass fibers are cut to ¼ to 2 inches long. Cellular concrete (concrete foam consisting of cement, water, and a foaming agent) with these short fiberglass strands creates a "hairy" surface which is extremely difficult for a soft-bodied drill to traverse. It is also envisioned that other sharp material could be embedded on the surface of the composite material during the formation of the desired structure. For example, fine broken glass could be surface applied to the composite material as it hardens into a solid structure.

The ratio of the various components by weight can vary. The range of the components by weight of the composite material is, in one preferred embodiment, as follows: binder 1 part; fine filler 0 to 3 parts; coarse filler 1 to 10 parts; organic material 0.0005 to 1 part; and (optionally) fiberglass fibers 0.5 to 10 pounds per cubic yard.

Examples of the Artificial Material are as Follows:

EXAMPLE 1

Material Composition for Harvesting Shellfish or General Food Production

| Material Ratios by Weight | | | | |
| --- | --- | --- | --- | --- |
| Binder | Fine Filler | Coarse Filler | Organic Material | Fiberglass Fibers (if any) |
| 1 part | 0 to 2 parts | 3 to 10 parts | .001 to 1 part | .5 to 10 lb/CuYd |

An example composition by weight would be 1 part Portland cement (binder), 6 parts #7 crushed limestone gravel, 0.4 parts water, 0.005 parts cottonseed with lint, and cement admixtures. The cement admixture can comprise an accelerator (0.0004 Pozzolith NC 534), a water reducer (0.005 parts Glenium 3400 NV), and a viscosity modifier (0.005 parts Rheomac VMA 362).

EXAMPLE 2

Material Composition for Structural/Breakwater Use

| Material Ratios by Weight | | | | |
| --- | --- | --- | --- | --- |
| Binder | Fine Filler | Coarse Filler | Organic Material | Fiberglass Fibers (if any) |
| 1 part | 1 to 3 parts | 1 to 5 parts | .0005 to 05 part | .5 to 10 lb/ CuYd |

An example composition by weight would be 1 part Portland cement (binder), 2 parts sand, 2 parts mixed crushed limestone gravel, 0.45 parts water, 0.01 parts cottonseed, and cement admixtures comprising 0.0004 Pozzolith NC 534, 0.005 parts Glenium 3400 NV, and 0.005 parts Rheomac VMA 362. All admixtures are commonly available.

Example 2 has a higher fine filler to binder ratio to form a more porous structure. The fines increase the strength of the resulting structure as opposed to Example 1, which is thought to be more prone to a crushing operation once the structures are harvested or removed from the aquatic environment. Crushing in Example 1 would be further facilitated by using a biodegradable adhesive as the binder. Once the adhesive binder partially degrades in the aquatic environment, it would relatively easy to disintegrate or crush after harvesting. Compositions can vary as desired within the range of components by weight as provided above.

In use, the composite material comprising at least the binder, the coarse filler, and the organic material is mixed together. The material hardens or cures into structure. The structure will generally have a desired shape using known techniques. The shape is dependent on whether the structure will be used as a breakwater/artificial reef or as a harvestable cultch structure. The resulting structure is transported to a desired aquatic location where it is anchored in place in order to promote the growth of aquatic organisms. It is envisioned that a harvestable cultch structure will be sized to be portable. In addition, the anchoring would preferably be readily removed in order to recover the structure (i.e., it would be harvestable).

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A cultch material, comprising:
   1 part by weight of at least one binding material,
   1-10 parts by weight of at least one coarse filler material, and
   0.0005 to 1 part by weight of at least one organic material, comprising at least one of seeds and peanuts comprising >1% nitrogen, >0% fat, and <10% sugar by weight;
   wherein the cultch material promotes aquatic organism growth thereon via metabolism of the at least one organic material by bacteria when exposed to aquatic conditions;
   wherein the binder material is a slowly biodegradable adhesive.

2. The material of claim 1, wherein the slowly biodegradable adhesive is selected from the group consisting of: a cornstarch polymer, animal-based protein glues, artificial (organic) biodegradable polymers, and mixture thereof.

3. The material of claim 1, wherein the at least one organic material consists essentially of cottonseed.

4. A cultch material, comprising:
   1 part by weight of at least one binding material comprising a slowly biodegradable adhesive,
   1-10 parts by weight of at least one coarse filler material, and
   0.0005 to 1 part by weight of at least one organic material, comprising >1% nitrogen, >0% fat, and <10% sugar by weight;
   wherein the cultch material promotes aquatic organism growth thereon via metabolism of the at least one organic material by bacteria when exposed to aquatic conditions.

5. The material of claim 4, further comprising fiberglass fibers, the fiberglass fibers comprising 0.5 to 10 pounds per cubic yard of the material.

6. The material of claim 5, wherein the fiberglass fibers are 0.25 to 2 inches long.

7. The material of claim 4, further comprising glass shards, the shards being applied to the surface of the material.

8. The material of claim 4, wherein the coarse filler comprises crushed limestone.

9. The material of claim 4, further comprising a fine filler component, the fine filler providing 0 to 3 parts of the material by weight.

10. The material of claim 9, wherein the fine filler comprises sand.

11. The material of claim 4, wherein the organic material supplies, by weight, between about 2% to 8% nitrogen, greater than or equal to 2% fat, and less than or equal to 2% sugar.

12. The material of claim 4, wherein the binder binding material is cement.

13. The material of claim 12, wherein the binder binding material includes cement additives selected from the group consisting of:
   accelerants, water reducers, viscosity modifiers, pozzolith, fly ash, or some mixture thereof.

14. The material of claim 4, wherein the slowly biodegradable adhesive is selected from the group consisting of:
   a cornstarch polymer, animal-based protein glues, artificial organic biodegradable polymers, and mixture thereof.

15. The material of claim 4, wherein the material forms an artificial reef structure.

16. The material of claim 4, wherein the material forms a harvestable aquatic cultch structure.

* * * * *